No. 756,533. Patented April 5, 1904.

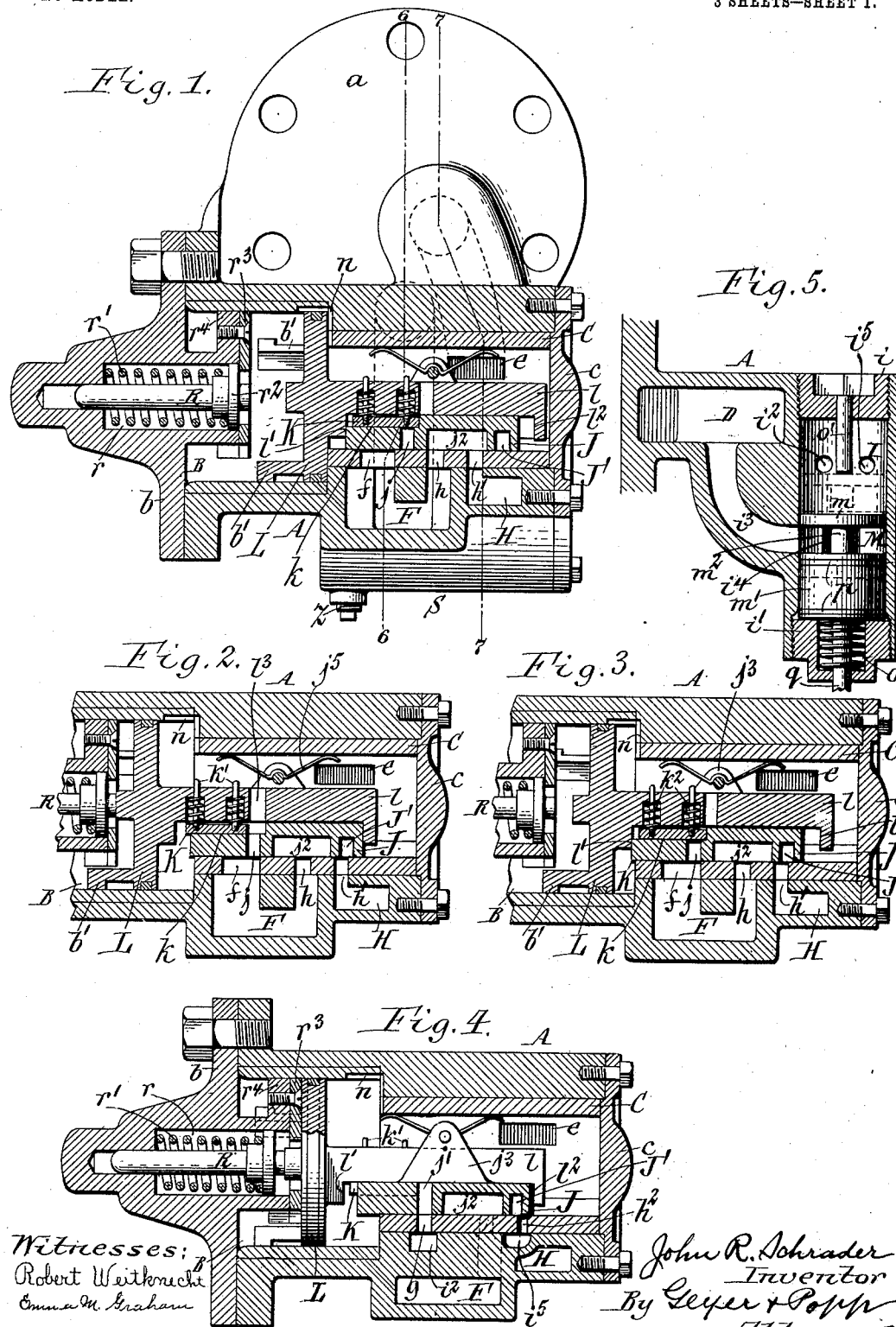

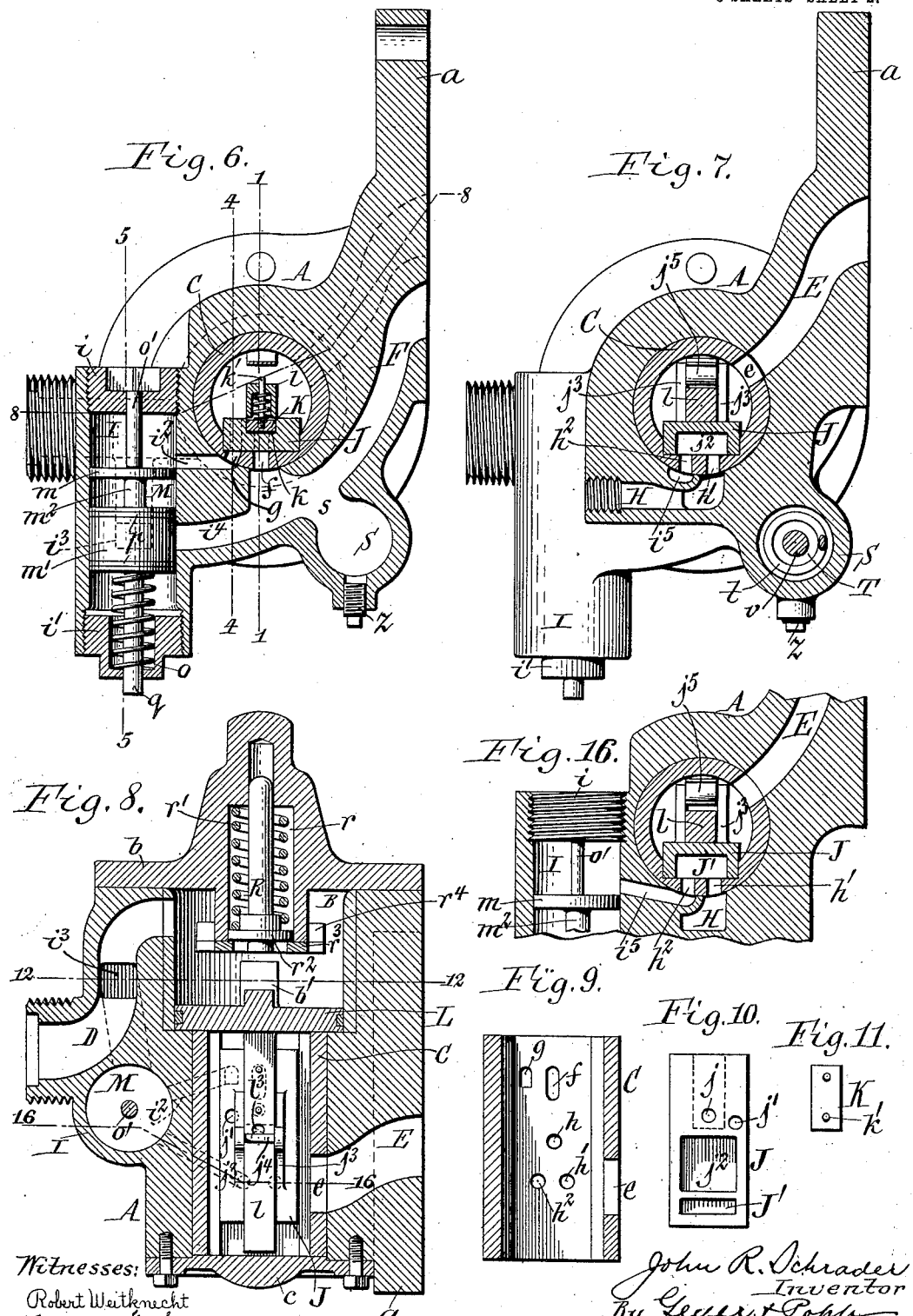

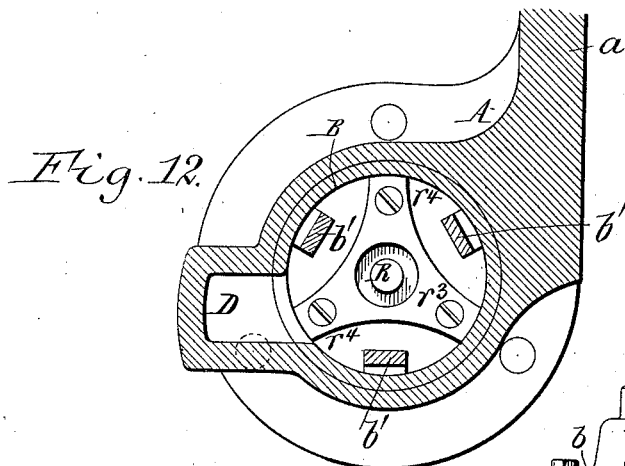
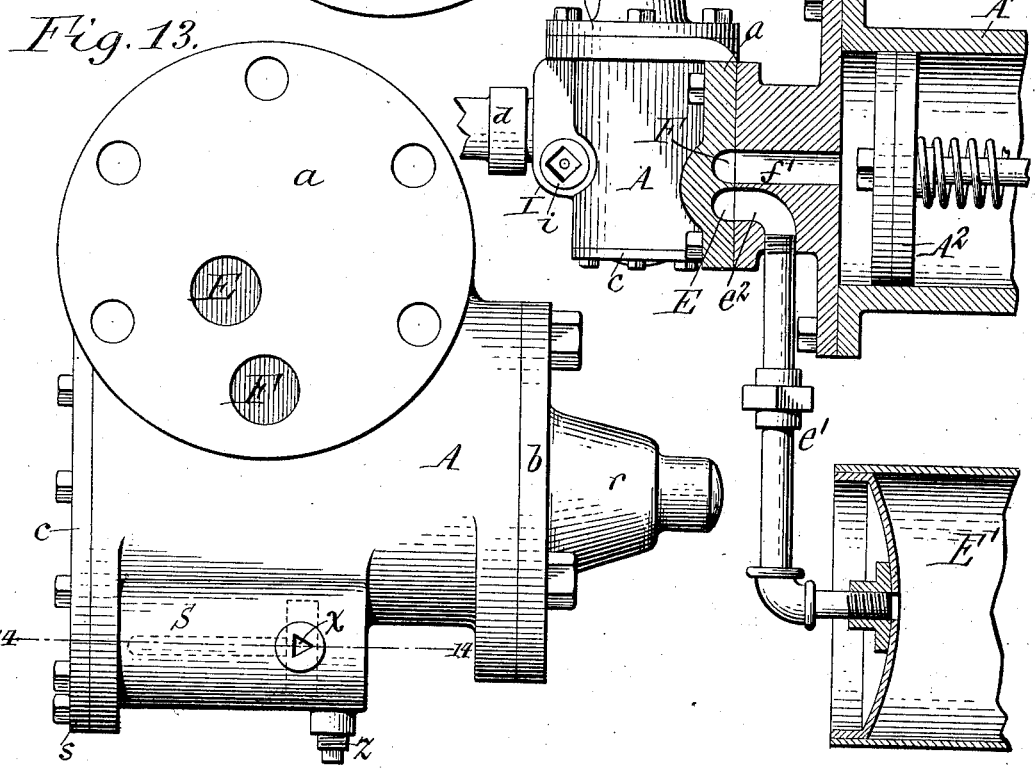
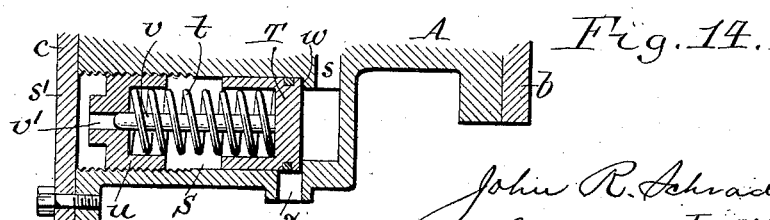

UNITED STATES PATENT OFFICE.

JOHN R. SCHRADER, OF BUFFALO, NEW YORK.

AIR-BRAKE MECHANISM.

SPECIFICATION forming part of Letters Patent No. 756,533, dated April 5, 1904.

Application filed November 18, 1902. Serial No. 131,839. (No model.)

*To all whom it may concern:*

Be it known that I, JOHN R. SCHRADER, a citizen of the United States, residing at Buffalo, in the county of Erie and State of New York, have invented new and useful Improvements in Air-Brake Mechanism, of which the following is a specification.

This invention relates to a valve mechanism for air-brakes. In its general organization this valve mechanism is substantially like that employed in the Westinghouse system; and it consists, essentially, of a main valve which controls the admission of air into the brake-cylinder, a graduating-valve which retains the air in the brake-cylinder, a piston which actuates the main and graduating valves, and an emergency-valve which controls the direct admission of air from the train-pipe into the brake-cylinder.

One of the objects of this invention is to produce a brake mechanism of this character in which the main and graduating valves are so constructed that the same wear uniformly and the wear is taken up automatically, thereby preventing leakage.

Another object of my invention is to provide an effective emergency-valve of simple construction having no rubber or similar packing which is liable to become dissolved or affected by oil and result in leakage.

Another object of this invention is to combine a high-speed reducing-valve permanently with the triple valve.

My invention has the further objects to simplify and improve the valve mechanism in other respects with a view of reducing the cost, rendering the parts more accessible for inspection and repairs, and to so arrange the various passages and ports that the course of the air is direct in applying the brakes and that a more perfect release of the brakes is obtained.

In the accompanying drawings, consisting of three sheets, Figure 1 is a vertical longitudinal section of the brake mechanism in line 1 1, Fig. 6, showing the position of the parts when the brakes are released. Fig. 2 is a similar view showing the position of the parts during an ordinary or service application of the brakes. Fig. 3 is a similar view showing the position of the parts for holding the brakes on. Fig. 4 is a similar section in line 4 4, Fig. 6, showing the position of the parts during an emergency application of the brakes. Figs. 6 and 7 are vertical transverse sections in lines 6 6 and 7 7, Fig. 1. Fig. 8 is a horizontal section in line 8 8, Fig. 6. Fig. 9 is a detached horizontal section of the valve-bushing. Fig. 10 is a bottom plan view of the main valve. Fig. 11 is a top plan view of the graduating-valve. Fig. 12 is a fragmentary cross-section in line 12 12, Fig. 8. Fig. 13 is a rear elevation of the triple-valve and high-speed reducing-valve casing. Fig. 14 is a fragmentary longitudinal section in line 14 14, Fig. 13. Fig. 15 is a fragmentary top plan view, on a reduced scale and partly in section, showing the connection between my improved valve mechanism and the auxiliary reservoir and brake-cylinder. Fig. 16 is a fragmentary vertical section in line 16 16, Fig. 8, the position of the parts corresponding to Fig. 3.

Similar letters of reference indicate corresponding parts throughout the several views.

A represents the hollow body of the valve mechanism provided on its inner or rear side with a coupling-head $a$, which is connected with the front head $a'$ of the brake-cylinder A'. Within the latter is arranged the brake-piston $A^2$, which is connected with the brake-shoes by a rigging of any suitable and well-known construction.

B represents a horizontal triple-valve cylinder, and C a horizontal bushing, forming a main or triple valve chamber or casing. This cylinder and chamber communicate at their inner opposing ends and are arranged in the body parallel with the plane of the coupling-head. The outer ends of the cylinder and bushing are closed by caps $b$ $c$, secured to the body.

D represents the main air-supply passage arranged in the front part of the body and serving to conduct the air from the usual brake or train pipe $d$ into the front end of the triple-valve cylinder.

In the body A is formed a reservoir-passage E, which extends from an opening $e$ in the rear side of the bushing to the rear side of the coupling-head $a$. This passage is connected with the auxiliary air-storage reservoir E' by a pipe $e'$ and a passage $e^2$ in the brake-cylinder head, whereby the interior of the bushing is placed in communication with said reservoir, as shown in Fig. 15. The bottom or lower part of the bushing is provided with a service-port $f$, an emergency-port $g$, and three release or exhaust ports $h$ $h'$ $h^2$. The service and emergency ports are arranged side by side in the inner or front part of the bushing, while the exhaust-ports $h'$ $h^2$ are arranged side by side behind the port $h$ in the rear or outer part of the bushing. From the service-port $f$ a main passage F extends laterally through the lower part of the body to the rear side of the coupling-head, where the same communicates with the brake-cylinder by a passage $f'$ in the front head of the same, as shown in Fig. 15.

I represents a supplemental-valve chamber which is arranged vertically in the body in front of the bushing and is closed at its upper and lower ends by screw-plugs $i$ $i'$, respectively. The upper end of this chamber is connected by an emergency feed-passage $i^2$ with the emergency-port $g$ and by an exhaust-passage $i^5$ with the exhaust-port $h^2$, while its lower end is connected by direct ports $i^3$ $i^4$ with the main supply-passage D and with the brake-passage F, leading to the brake-cylinder, respectively, as shown in Figs. 5, 6, and 16. The ports $i^3$ $i^4$ are transversely in line with each other, but at different points circumferentially of the valve-chamber I. The inner exhaust-port $h$ is connected with the brake-passage F, while the outer exhaust-port $h'$ communicates with the atmosphere by an exhaust-passage H, arranged in the lower part of the body and extending laterally from the outer exhaust-port to the front side of the body, as shown in Figs. 1 and 7.

J represents the main slide-valve, which controls the admission of air to the brake-cylinder and the exhaust of the same therefrom; K, the graduating-valve, whereby the air is retained in the brake-cylinder for holding the brakes on; L, the triple-valve piston, which actuates the main and graduating valves, and M the emergency-valve whereby direct communication between the train-pipe and the brake-cylinder is controlled. The main valve slides in a longitudinal guideway or seat in the lower side of the bushing and is provided with service and emergency ports $j$ $j'$, which extend vertically through the same and are adapted to register with the service and emergency ports of the bushing. In rear of its ports $j$ $j'$ the main valve is provided on its under side with a main exhaust cavity or recess $j^2$, which is adapted to establish or cut off communication between the exhaust-ports $h$ $h'$ $h^2$ and the exhaust-passage H and an emergency exhaust-cavity J' for connecting the ports $h'$ $h^2$ and venting the upper end of the supplemental chamber into the exhaust-passage H. The graduating-valve K slides on a longitudinal guideway or seat $k$, formed in the upper front part of the main valve, and is adapted to open and close the service-port $j$, which extends from its seat in the top of the main valve to the under side of the same. The triple-valve piston L reciprocates within the cylinder B and is provided on its rear side with a longitudinal stem $l$, which extends over the main and graduating valves and is arranged between two lugs $j^3$ $j^3$, extending upwardly from the main valve. Above this stem these lugs are connected by a cross-pin $j^4$, and between the latter and the top of the bushing is arranged a spring $j^5$, whereby the main valve is pressed against its seat. On the under side of the stem at its front and rear ends the same is provided with shoulders $l'$ $l^2$, which are constructed to engage against the front and rear ends of the main valve. The distance between these shoulders is greater than the length of the main valve, so as to form a slack connection between these parts which permits the piston-stem to move lengthwise a limited extent independent of the main valve.

$l^3$ represents an air-passage which extends vertically through the piston-stem and which is adapted to register with the service-port $j$ of the main valve upon moving the stem into its foremost position on the main valve, as shown in Fig. 2. From the graduating-valve two coupling-pins $k'$ $k'$ extend upwardly through openings in the piston-stem, whereby this valve and the stem are compelled to move lengthwise together. The graduating-valve is pressed against its seat on the main valve by springs $k^2$, each of which is arranged in a socket in the stem around one of the coupling-pins and bearing at opposite ends against the top of the graduating-valve and the bottom of its socket, as shown in Figs. 1 to 3 and 6.

$n$ represents the by-pass or feeding-groove, which is formed in the cylinder B and which is adapted to be opened and closed by the triple-valve piston.

In order to prevent the triple-valve piston from tilting and binding in its cylinder, the same is provided on its front side with a plurality of forwardly-projecting guide-lugs $b'$, which engage with the bore of this cylinder.

The emergency-valve M, which is of cylindrical form, reciprocates vertically in the chamber I and is reduced or contracted near its upper end, so as to form a short upper section $m$, a comparatively long lower section $m'$, and a neck $m^2$, connecting the two sections. The emergency-valve is normally held in its elevated position by a spring $o$, interposed between the lower end of the same and the lower plug of the chamber I. The upward movement of the emergency-valve is limited by a stop $o'$, depending from the upper plug of the emergency-valve chamber. When the emergency-valve is in its uppermost position, its upper section is below the emergency and exhaust passages $i^2$ $i^5$ and its lower section covers the direct ports $i^3$ $i^4$, as shown in Fig. 6, thereby preventing the air from passing directly from the main passage D to the brake-passage F. The lower section of the emergency-valve is provided at its ends with packing-rings $p$, which in the normal elevated position of this valve are arranged above and below the ports $i^3$ $i^4$ and effectually prevent the air from passing this valve when the same is closed. When the emergency-valve is depressed into its lowermost position, its reduced portion is opposite the direct ports $i^3$ $i^4$ and places the same in communication, as shown in Fig. 5.

$q$ represents a stem which extends downwardly from the emergency-valve through the lower plug $i'$ and which permits of tapping this valve from the outside and loosening the same in case it sticks and fails to work promptly.

R represents a graduating-stem which during an ordinary or service application of the brakes arrests the piston at the required place for operating the main and graduating valves, so that only the air from the auxiliary reservoir is permitted to enter the brake-cylinder, but which recedes under the impact of the triple-valve piston during an emergency application of the brakes for operating the valves, so that additional air is permitted to pass directly from the train-pipe to the brake-cylinder. This stem is movable lengthwise in a socket $r$ in the inner side of the cylinder-head $b$ and is yieldingly held in its normal or projected position by a spring $r'$, arranged in the socket and bearing at opposite ends against the bottom thereof, and a shoulder or head $r^2$ on the inner end of the stem. The graduating-stem is confined in its socket by a plate $r^3$, which is secured to the inner end of the socket and is engaged by the head of the stem, said plate having a central opening through which the inner end of the stem projects, as shown in Fig. 1. The inner end of the socket projects inwardly from the head $b$, and in order to prevent the same from becoming displaced by the blows of the piston L the inner end of the socket is provided with laterally-extending lugs $r^4$, which fit into the bore of the triple-valve cylinder and steady the socket. These steadying-lugs are arranged opposite the spaces between the guide-lugs of the opposing piston, so as not to interfere with the same and permit the piston to move forward its fullest extent, as represented in Fig. 4. The socket $r$ is made integral with the head of the triple-valve cylinder, and the latter is solid or imperforate, thereby avoiding any joints through which air is liable to leak and impair the efficiency of the brake.

The operation of the valve mechanism thus far described is as follows: Assuming that the parts of the valve mechanism are in the position shown in Figs. 1, 6, and 8 and that air under pressure is delivered from the train-pipe $d$ to the main supply-passage D, this air passes into the cylinder B, thence through the feeding-groove $n$ into the bushing, and thence through the opening $e$ in the latter and the passage F into the auxiliary reservoir E', in which the air is stored, and the pressure therein rises until it is the same as the maximum pressure maintained in the source of supply. While the parts are in this position the air is prevented from escaping by reason of the main valve closing the service and emergency ports $f$ $g$ in the bushing and the emergency-valve closing the direct ports $i^3$ $i^4$. When it is desired to apply the brakes for ordinary service, the pressure in the train-pipe is gradually reduced by opening the usual engineer's valve in the cab of the engine and permitting more or less of the air in the train-pipe to escape into the atmosphere. The instant the pressure in the train-pipe is reduced the preponderating pressure in the auxiliary reservoir, which is now exerted against the inner side of the triple-valve piston, forces the latter backwardly until the same reaches the position shown in Fig. 2, where it is arrested by encountering the graduating-stem. During this movement of the piston the main valve remains at rest until the graduating-valve has uncovered the service-port $j$ in the main valve and the rear shoulder of the stem engages with the main valve. Thereafter the latter moves forward with the piston and graduating-valve, and at the end of this movement the service-port $j$ in the main valve is in register with the service-port $f$ of the bushing, as shown in Fig. 2. At the same time the solid part of the main valve in rear of its exhaust-cavity $j^2$ covers the rear exhaust-ports $h'$ $h^2$ and the piston moves beyond the feeding-groove $n$, whereby escape of air from the auxiliary reservoir at these places is prevented. The instant the parts reach this position the compressed air from the auxiliary reservoir passes successively through the passage $l^3$ in the piston-stem, the service-ports $j$ $f$ in the main valve and bushing, and thence through the brake-passage F to the brake-cylinder, whereby the piston $A^2$ in the latter is driven forwardly with a moderate pressure and an ordinary application of the brakes is effected. Upon closing the engineer's valve after the brakes have been applied and the pressure in the auxiliary reservoir and brake-cylinder has dropped slightly below that in the train-pipe the piston is moved forwardly by the excess pressure in the train-pipe sufficiently to move the graduating-valve over the service-port $j$ in the main valve, as shown in Fig. 3, thereby holding the brakes in their operative position and preventing further escape of air from the auxiliary reservoir into the brake-cylinder. For the purpose of making a more powerful application of the brakes in case of an emergency the engineer's valve is opened quickly for venting and reducing the pressure in the train-pipe suddenly. This causes the air-pressure in the auxiliary reservoir to drive the triple-valve piston backwardly so rapidly that its momentum overcomes the tension of the spring $r'$, causing the latter to yield under the blow of the piston against the graduating-stem and permitting the same, together with the valves connected therewith, to move backwardly an abnormal distance. By this additional movement the emergency-port $j'$ of the main valve is brought into register with the emergency-port $g$ of the bushing, permitting compressed air to flow from the bushing through the passage $i^2$ into the upper end of the supplemental-valve chamber I. The air thus admitted into the latter forces the emergency-valve downwardly, so that its reduced portion is in line with the direct air-ports $i^3 i^4$ and connects the same, as shown in Fig. 5, whereby the compressed air in the train-pipe is conducted directly to the brake-passage F, where it unites with the compressed air from the auxiliary reservoir for producing an extraordinary pressure upon the piston in the brake-cylinder. Immediately after the piston strikes the stem and moves backwardly an abnormal distance the same rebounds into its normal service position, so that the emergency-ports are only momentarily uncovered for effecting a powerful initial application of the brakes. As the piston rebounds into its normal or service position the main valve is also moved forwardly into the position in which its emergency-cavity $J'$ connects the ports $i^5$ and $h'$, as shown in Figs. 3 and 16, thereby venting the upper end of the supplemental-valve chamber into the atmosphere through the exhaust-passage H, and permitting the emergency-valve M to be raised under the action of its spring O for closing the ports $i^3 i^4$ and cutting off direct communication between the train-pipe and the brake-cylinder. The emergency-pressure on the brakes is thus immediately reduced to the ordinary service-pressure by the return of the emergency-valve to its normal elevated position. For the purpose of releasing the brakes the pressure in the train-pipe is again raised to normal by connecting the same with the main air-reservoir or other source of supply. This rise of pressure in the train-pipe causes the triple-valve piston to be moved forward into its innermost position, as shown in Figs. 1 and 8. In this position the main valve again closes the service-ports and the air passes through the feeding-groove into the bushing, and thence to the auxiliary reservoir, where the pressure is accumulated preparatory to the next application of the brakes. While the main valve is thus returned to its foremost position, its exhaust-cavity $j^2$ connects the exhaust-ports $h h'$ of the bushing, thereby permitting the air to escape from the brake-cylinder through the exhaust-passage H into the atmosphere, whereby the brakes are permitted to relax into their inoperative position.

A high-speed reducing-valve is provided for gradually reducing the pressure of the air to normal upon applying these brakes when the train is running at high speed. This valve is constructed as follows:

S represents the casing of the reducing-valve, which is arranged horizontally on the body A in rear of the triple-valve casing and is preferably cast in one piece therewith. This casing has its inner end connected by a branch passage $s$ with the brake-passage F in the triple-valve casing, while its outer end is closed by a cover or head $s'$, as shown in Figs. 6 and 14. This head is preferably made in one piece with the head of the triple-valve chamber; but, if desired, the same may be made separate.

T represents a piston-valve which is arranged in the inner end of the reducer-casing and which is yieldingly retained in its innermost position by a spring $t$. This spring is interposed between the piston-valve and an adjusting-plug $u$, which is screwed into the outer end of the reducer-casing.

$v$ represents a guide-rod extending from the back of the piston-valve through the center of the spring and through a central opening $v'$ in the adjusting-plug. The inward movement of the piston-valve is limited by an internal shoulder or stop $w$, which arrests this valve just before the same reaches the branch passage $s$. In its innermost position the piston-valve covers a relief-opening $x$, which is preferably of triangular form and so constructed that the same gradually widens or becomes larger from the inner or front end of the reducer-casing toward the outer or rear end, as shown in Fig. 13. Upon admitting the air under high pressure into the brake-cylinder this air also presses against the inner end of the reducing piston-valve T and moves the same outwardly or backwardly against the resistance of its spring. As the reducing-valve is moved backward it uncovers the relief-opening $x$ and permits the air to escape, thereby reducing the pressure of the air after the first impact of the brakes against the wheels has been effected. This reduction in the pressure of the air is effected gradually owing to the gradual widening of the relief-opening in the direction in which the valve moves for uncovering the same. After the air-pressure has been reduced to normal the reducing-valve is again closed by its spring, and the pressure of the brakes is equalized over the entire train. By screwing the adjusting-plug $v'$ inwardly or outwardly the tension of the spring $v$ may be increased or decreased for varying the pressure with which the brakes are applied in checking the speed or stopping the train. The reducing-valve casing is preferably provided in line with its supply-opening $s$ with a nipple, which is adapted to receive a gage for testing the air-pressure. This nipple is normally closed by a screw-plug $z$.

By forming the casing of the reducing-valve integral with the triple-valve casing the cost of the valve mechanism is reduced, the construction is simplified, and the parts are prevented from becoming lost or misplaced, because they are permanently connected.

My improved brake mechanism is very compact, which is desirable owing to the limited space available underneath the cars. All of the parts are easy of access for inspection and repairs. The air is conducted with directness to the brake-cylinder, enabling the brakes to be applied quickly and also enabling the release of the brakes to be effected promptly, thereby avoiding unnecessary delay in running the train.

I claim as my invention—

1. In a brake mechanism, the combination of a valve-chamber, a cylinder connected at its inner end with the valve-chamber, a valve arranged in said chamber, a piston arranged in the cylinder and connected on its rear side with the valve, guide-lugs arranged on the front side of the piston and engaging with the bore of the cylinder, a head closing the outer end of the cylinder and having a socket projecting inwardly therefrom, a graduating stem arranged in the socket and adapted to be engaged by the piston, a spring arranged in the socket and engaging with said stem for resisting the outward movement thereof, a stop applied to the inner end of the socket for limiting the inward movement of said stem, and steadying-lugs arranged on the inner end of the socket opposite the spaces between the guide-lugs on the piston and engaging with the bore of the cylinder, substantially as set forth.

2. In a brake mechanism, the combination of a main-valve chamber having connections with a supply-pipe, an auxiliary reservoir and a brake-cylinder, a supplemental-valve chamber having connections with said supply-pipe, the main-valve chamber and brake-cylinder connection, a main valve for controlling the connection between the main-valve chamber and the brake-cylinder and supplemental chamber, and an emergency-valve for controlling the connections between said supplemental chamber and the supply-pipe and brake-cylinder and consisting of two connected piston-sections moving in the supplemental chamber, one of said sections being acted upon by pressure from said main chamber while the other section is arranged to open and close the connections between said supplemental chamber and the supply-pipe and brake-cylinder, substantially as set forth.

3. In a brake mechanism, the combination of a main-valve chamber having connections with a supply-pipe, an auxiliary reservoir and a brake-cylinder, a supplemental-valve chamber connected at one end by an emergency-passage with the main-valve chamber and at its opposite end by separate ports with the supply-pipe and brake-cylinder connection, a main valve for controlling the connections between said main chamber and said supplemental chamber and brake-cylinder, and an emergency-valve for controlling the connections between the supplemental-valve chamber and the supply-pipe and brake-cylinder and consisting of two connected piston-sections moving in said supplemental chamber, one of said sections being arranged to open and close said ports while the other section is arranged between the emergency-passage and said ports and adapted to be acted upon by pressure from the main-valve chamber, substantially as set forth.

4. In a brake mechanism, the combination of a main-valve chamber having connections with a supply-pipe, an auxiliary reservoir and a brake-cylinder, a supplemental-valve chamber connected at one end by an emergency-passage with the main-valve chamber and at its opposite end by separate ports with the supply-pipe and brake-cylinder connection, a main valve for controlling the connections between the main chamber and the supplemental chamber and brake-cylinder, an emergency-valve for controlling the connections between the supplemental-valve chamber and the supply-pipe and brake-cylinder and consisting of two connected piston-sections moving in the supplemental-valve chamber, one of said sections being arranged to open and close said ports while the other section is arranged between the emergency-passage and said ports and adapted to be acted upon by pressure from the main-valve chamber for opening this valve, and a spring for closing the emergency-valve, substantially as set forth.

5. In a brake mechanism, the combination of a main-valve chamber having connections with a supply-pipe, an auxiliary reservoir and a brake-cylinder, a supplemental-valve chamber connected at one end by an emergency-passage with the main-valve chamber and at its opposite end by separate ports with the supply-pipe and brake-cylinder connection, a main valve for controlling the connections between the main chamber and the supplemental chamber and brake-cylinder, an emergency-valve for controlling the connections between the supplemental chamber and the supply-pipe and brake-cylinder and consisting of two connected piston-sections moving in said supplemental chamber, one of said sections being arranged to open and close said ports while the other section is arranged between the emergency-passage and said ports and adapted to be acted upon by pressure from the main-valve chamber, and a stem arranged on one end of the emergency-valve and projecting through the adjacent head of its chamber, substantially as set forth.

6. In a brake mechanism, the combination of a main-valve chamber having connections with a supply-pipe, an auxiliary reservoir and a brake-cylinder, a supplemental-valve chamber connected at one end by an emergency feed-passage with the main-valve chamber and by emergency exhaust-ports with an exhaust-passage and at its opposite end by separate ports with the supply-pipe and brake-cylinder connection, a main valve for controlling the connections between the main chamber and the supplemental chamber and brake-cylinder and between said exhaust ports and passage, and an emergency-valve for controlling the connections between the supplemental-valve chamber and the supply-pipe and brake-cylinder and consisting of two connected piston-sections moving in the supplemental-valve chamber, one of said sections being arranged to open and close said ports while the other section is arranged between the emergency feed and exhaust passages and said ports and adapted to be acted upon by pressure from the main-valve chamber, substantially as set forth.

7. In a brake mechanism, the combination of a body having a main-valve chamber, a passage for connecting the cylinder with a supply-pipe, a coupling-plate arranged on one side of said chamber and cylinder, reservoir and brake passages extending from said chamber to the face of said plate, and a supplemental-valve chamber arranged on the opposite side of the main-valve chamber and having connections with the main-valve chamber and the supply-pipe and brake-passage, a main valve arranged in the main chamber for controlling the connection of said chamber with the brake-passage and with the supplemental chamber, and an emergency-valve arranged in the supplemental chamber for controlling the connection between the supply-pipe and the brake-passage, substantially as set forth.

8. In a brake mechanism, the combination of a body having a horizontal main-valve chamber, a horizontal cylinder connected with said valve-chamber, a supply-passage for connecting the cylinder with a train-pipe, a coupling-plate arranged vertically on the rear side of said chamber and cylinder, reservoir and brake passages extending from said chamber to the face of said plate, a supplemental-valve chamber arranged vertically in front of the main-valve chamber, an emergency-passage connecting the upper end of the supplemental chamber with the main chamber, ports connecting the lower end of the supplemental chamber with the supply-passage and the brake-passage, a main valve controlling the connection between the main chamber and the brake-passage and emergency-passage, a piston arranged in said cylinder and connected with the main valve, an emergency-valve arranged in the supplemental chamber and consisting of two connected piston-sections, the upper section being arranged below the emergency-passage while the lower section is adapted to open and close said ports, and a spring for normally holding the emergency-valve in its elevated position, substantially as set forth.

9. In a brake mechanism, the combination of a triple-valve casing, a reducing-valve casing formed integrally with the triple-valve casing and connected at one end with the brake-passage of said triple casing, and a reducing-valve arranged in said reducing-casing, substantially as set forth.

10. In a brake mechanism, the combination of a reducing-valve casing provided with a relief-opening, and a reducing-valve which controls said opening and uncovers the same when subjected to the brake applying air-pressure, said opening gradually widening in the direction in which the valve is moved under air-pressure for uncovering the opening and permitting the air to vent into the atmosphere, substantially as set forth.

Witness my hand this 21st day of October, 1902.

JOHN R. SCHRADER.

Witnesses:
THEO. L. POPP,
EMMA M. GRAHAM.